United States Patent
Zlati et al.

(10) Patent No.: US 10,554,575 B2
(45) Date of Patent: Feb. 4, 2020

(54) EQUITABLE SHARING OF SYSTEM RESOURCES IN WORKFLOW EXECUTION

(71) Applicant: Microsoft Technology Licensing, LLC., Redmond, WA (US)

(72) Inventors: Nicoleta Zlati, Kirkland, WA (US); Felix Man Toe Cho, Redmond, WA (US); Erik Jonas Kallstrom, Redmond, WA (US); Anirudh Garg, Sammamish, WA (US); Igor Sedukhin, Issaquah, WA (US); Manoj Nayar, Redmond, WA (US); Mohamed Enein, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 136 days.

(21) Appl. No.: 15/787,827

(22) Filed: Oct. 19, 2017

(65) Prior Publication Data

US 2018/0102982 A1    Apr. 12, 2018

Related U.S. Application Data

(63) Continuation of application No. 14/465,646, filed on Aug. 21, 2014, now Pat. No. 9,800,519.

(51) Int. Cl.
*G06F 15/16* (2006.01)
*H04L 12/911* (2013.01)
(Continued)

(52) U.S. Cl.
CPC ............ *H04L 47/783* (2013.01); *G06F 9/485* (2013.01); *G06F 9/5083* (2013.01); *H04L 29/08144* (2013.01); *H04L 67/1002* (2013.01)

(58) Field of Classification Search
CPC .......... H04L 29/08144; H04L 67/1002; G06F 9/485; G06F 9/5083
(Continued)

(56) References Cited

U.S. PATENT DOCUMENTS

| | | | |
|---|---|---|---|
| 5,918,049 A | 6/1999 | Syvaniemi | |
| 6,213,652 B1 * | 4/2001 | Suzuki | G06F 3/1204 358/1.15 |

(Continued)

FOREIGN PATENT DOCUMENTS

| | | |
|---|---|---|
| CN | 1333508 A | 1/2002 |
| CN | 1836212 A | 9/2006 |

(Continued)

OTHER PUBLICATIONS

"IBM Platform Dynamic Cluster", Retrieved From: <<https://web.archive.org/web/20160107133438/http://www-03.ibm.com/systems/platformcomputing/products/lsf/dynamiccluster.html>>, Retrieved on: Jun. 3, 2014, 2 Pages.

(Continued)

*Primary Examiner* — Anthony Mejia
(74) *Attorney, Agent, or Firm* — Workman Nydegger

(57) ABSTRACT

A method may be practiced in a distributed computing environment that provides computing resources to a plurality tenants. The method includes acts for allocating a limited set of system resources to the tenants. The method includes identifying a resource slice. The method further includes identifying an executing tenant workload. Checkpoint characteristics are identified for the executing tenant workload. Based on the checkpoint characteristics and the resource slice, a task eviction event is identified.

20 Claims, 3 Drawing Sheets

(51) Int. Cl.
  *H04L 29/08* (2006.01)
  *G06F 9/48* (2006.01)
  *G06F 9/50* (2006.01)
(58) Field of Classification Search
  USPC .......................................................... 709/201
  See application file for complete search history.

(56) References Cited

U.S. PATENT DOCUMENTS

| | | | |
|---|---|---|---|
| 6,574,717 | B1 | 6/2003 | Ngai et al. |
| 8,132,043 | B2 | 3/2012 | Dash et al. |
| 8,683,495 | B1 | 3/2014 | Moore et al. |
| 10,031,819 | B2 * | 7/2018 | Banerjee ............. G06F 9/44505 |
| 2008/0120620 | A1 * | 5/2008 | Lett ........................ G06F 9/485 718/103 |
| 2009/0320032 | A1 * | 12/2009 | Avni ..................... G06F 9/4881 718/103 |
| 2010/0122256 | A1 | 5/2010 | Darrington et al. |
| 2010/0228861 | A1 * | 9/2010 | Arsovski ............... G06F 9/5027 709/226 |
| 2010/0262860 | A1 | 10/2010 | Sargor et al. |
| 2011/0119525 | A1 * | 5/2011 | Muralimanohar .. G06F 11/1438 714/15 |
| 2011/0145392 | A1 | 6/2011 | Dawson et al. |
| 2011/0153824 | A1 | 6/2011 | Chikando et al. |
| 2012/0110581 | A1 | 5/2012 | Watson et al. |
| 2012/0117421 | A1 * | 5/2012 | Craft ................... G06F 11/1471 714/15 |
| 2012/0131591 | A1 | 5/2012 | Moorthi et al. |
| 2013/0139172 | A1 | 5/2013 | An et al. |
| 2013/0185735 | A1 * | 7/2013 | Farrell .................... G06F 9/542 719/318 |
| 2013/0254407 | A1 | 9/2013 | Pijewski et al. |
| 2014/0019981 | A1 | 1/2014 | Boyer et al. |
| 2014/0164829 | A1 * | 6/2014 | Borda ................. G06F 11/1446 714/15 |
| 2014/0181833 | A1 * | 6/2014 | Bird ...................... G06F 9/5016 718/105 |
| 2014/0215481 | A1 * | 7/2014 | Piet ...................... G06F 9/5061 718/104 |
| 2015/0143381 | A1 * | 5/2015 | Chin ...................... G06F 9/485 718/104 |

FOREIGN PATENT DOCUMENTS

| | | |
|---|---|---|
| CN | 101073064 A | 11/2007 |
| CN | 101369241 A | 2/2009 |
| CN | 102289392 A | 12/2011 |
| RU | 2005130350 A | 4/2007 |
| WO | 9403855 A1 | 2/1994 |

OTHER PUBLICATIONS

"Final Office Action Issued in U.S. Appl. No. 14/465,646", dated Feb. 14, 2017, 7 Pages.

"Non Final Office Action Issued in U.S. Appl. No. 14/465,646", dated Jun. 15, 2016, 17 Pages.

"Notice of Allowance Issued in U.S. Appl. No. 14/465,646", dated Jun. 19, 2017, 7 Pages.

Ananthanarayanan, et al., "True Elasticity in Multi-Tenant Data-Intensive Compute Clusters", In Proceedings of the 3rd ACM Symposium on Cloud Computing, Oct. 14, 2012, 7 Pages.

Cho, et al., "Natjam: Eviction Policies for Supporting Priorities and Deadlines in Mapreduce Clusters", In Proceedings of Computer Science Research and Tech Reports, Retrieved on: Jun. 3, 2014, 16 Pages.

Pastorelli, et al., "Practical Size-Based Scheduling for MapReduce Workloads", In Proceedings of the Computing Research Repository, Jan. 2013, 12 Pages.

"International Search Report and Written Opinion Issued in PCT Application No. PCT/US2015/045977", dated Nov. 25, 2015, 11 Pages.

"Second Written Opinion Issued in PCT Application No. PCT/US2015/045977", dated Aug. 23, 2016, 8 Pages.

"International Preliminary Report on Patentability Issued in PCT Application No. PCT/US2015/045977", dated Dec. 13, 2016, 9 Pages.

"Office Action Issued in European Patent Application No. 15756316.4", dated Nov. 26, 2018, 9 Pages.

"Office Action Issued in Russian Patent Application No. 2017105354", dated Feb. 26, 2019, 6 Pages. (W/o English Translation).

"Summons to Attend Oral Proceedings Issued in European Patent Application No. 15756316.4", Mailed Date: May 7, 2019, 7 Pages.

"First Office Action and Search Report Issued in Chinese Patent Application No. 201580043865.9", dated Oct. 11, 2019, 13 pages.

* cited by examiner

EQUITABLE SHARING OF SYSTEM RESOURCES IN WORKFLOW EXECUTION

CROSS-REFERENCE TO RELATED APPLICATIONS

This application is a continuation of U.S. patent application Ser. No. 14/465,646 filed on Aug. 21, 2014, entitled "Equitable Sharing of System Resources in Workflow Execution," which issued as U.S. Pat. No. 9,800,519 on Oct. 24, 2017, the entirety of each of which is incorporated herein by reference.

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Some cloud providers use a partitioned scale up approach to allow the service to scale for increased usage. The service implements a concept of scale units (finite set of resources) that support a known set of users. Capacity is added by adding additional scale units as required when user limits are hit for the existing scale units. User limit is defined as a given number of users who will be affinitized to a scale unit that will execute all of their workload requests.

The set of available resources within a scale unit is finite and fixed but the system has to be able to deal with varying workload loads requested by the affinitized users without compromising the end user service level agreement (SLA) in terms of workloads being guaranteed execution time. There are various ways to potentially solve the problem One way is to dynamically scale out or up. This approach requires just-in-time addition or removal of system resources based on current demand factors. Implementing such an approach to a live running service requires a whole set of dependent factors which are hard to implement and maintain, not to mention the buffer that would be needed in terms of capacity because of time considerations when elastically expanding or contracting.

Another solution would be to determine the workload duration based on the workflow analysis. The purpose would be to prevent the workloads exceeding a certain duration from running. This solution can be difficult to implement. For example, a workflow can contain single calls that are internally implemented as infinite loops which would be prevented from being called. Further, restricting the set of activities that the user is allowed to use in the workflows creates a bad user experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment that provides computing resources to a plurality tenants. The method includes acts for allocating a limited set of system resources to the tenants. The method includes identifying a resource slice. The method further includes identifying an executing tenant workload. Checkpoint characteristics are identified for the executing tenant workload. Based on the checkpoint characteristics and the resource slice, a task eviction event is identified.

Another embodiment includes a cloud service configured to fairly allocate a limited set of resources to tenants of the cloud service. The cloud service includes a scheduling service. The scheduling service is configured to receive workloads from tenants of the cloud service. The cloud service includes a plurality of workers coupled to the scheduling service. The workers are configured to receive workloads from the scheduling service. The workers are configured to execute workloads from tenants based on resource slices in conjunction with an evaluation of checkpointing of workloads, such that task eviction events are based on resource slices and workload checkpointing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some embodiments illustrated herein implement guaranteed execution resource slices for workloads that can be persisted, evicted and later resumed from the last persisted state (i.e., workloads that are checkpointed) as a way to ensure equitable sharing of system resources. Various different resources could be sliced. For example, a time slice of one or more system resources could be implemented. Thus for example, the slices may be one or more of a timed amount of a processor, a timed amount of memory access, a timed amount storage access, a timed amount of network usage, or combinations thereof. Alternatively or additionally, the resource slice could be a number of commands (e.g. script activities). Alternatively or additionally, the resource slice could be a number of processor operations. Alternatively or additionally, the resource slice could be an amount of network resources, such as an amount of data transmitted on a network. Alternatively or additionally, the resource slice could be an amount of storage resources, such as an amount of I/O to and from storage devices. Alternatively or additionally, the resource slice could be sandbox execution environment resources. Alternatively or additionally, the resource slice could be an amount of memory resources. Etc. While a number of different resource slices could be used alone or in combination, the example below is illustrated in the context of time slices, but other resources slices could be substituted.

Figure 1:
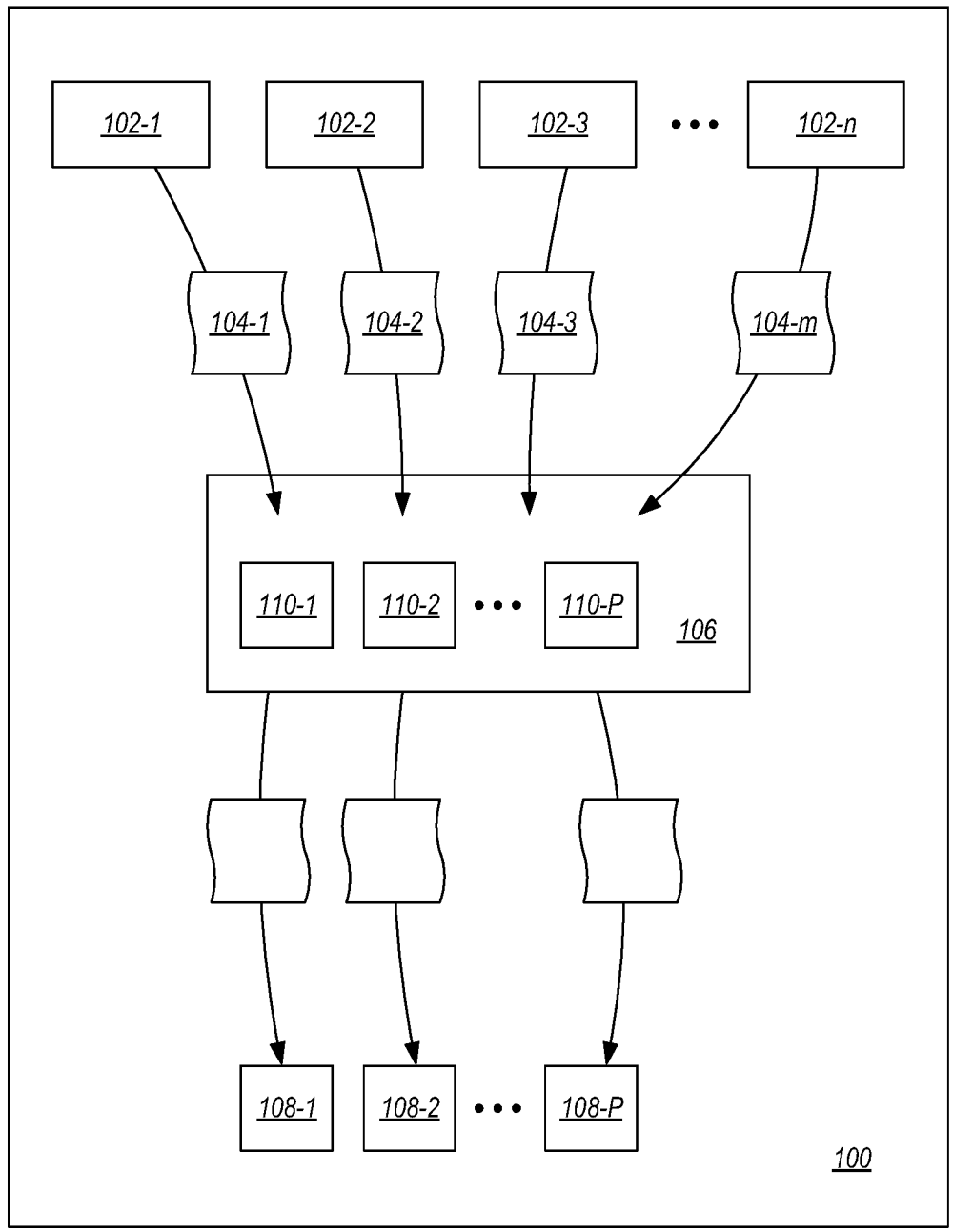
FIG. 1 illustrates a cloud based system configured to fairly allocated cloud resources.

Referring now to FIG. 1, an example is illustrated. In the example illustrated in FIG. 1, a cloud service 100 performs workloads for tenants 102-1, 102-2, 102-3 through 102-*n* of the cloud service 100. In the example, illustrated, the tenants send workloads 104-1, 104-2, 104-3 through 104-*m* to a scheduling service 106. The scheduling service 106 assigns the workloads to various workers 108-1, 108-2 through 108-*p*. The workers use certain resources of the cloud service 100.

To ensure that resources are shared fairly, workloads may be allowed to only use a given amount of resources before the workloads are evicted to give other workloads a chance to be performed. If the workloads are not completed at eviction, the workloads will be re-queued in the scheduling service 106 so that they can be given another turn to use cloud service resources.

In one typical example, resources will be time sliced. Thus, for example, a workload may be given a certain amount of time to complete, or to reach a checkpoint where work on the workload can be easily persisted such that the workload can be continued from the persisted state when the workload is allocated to a worker again. If the workload reaches the checkpoint and persists, then the workload can be evicted. This persists work that has been performed for the workload. If the workload exceeds the amount of time (or other resource slice allocation in other embodiments), then the workload is evicted even though the state cannot be persisted. This will result in the loss of work done on the workload. Thus, a workload may be assigned to a worker, such as worker 108-1. The worker will perform the workload until expiration of, in this example, a predetermined amount of time. If the time expires without the workload being persisted, then the workload will be evicted. If the workload reaches a checkpoint and is persisted, the workload will be evicted in this case as well.

Note that fairness does not necessarily mean that resources are evenly divided. Fairness may take into account several different factors that result in some tenants being provided a greater share of resources than other tenants. For example, a tenant that has paid a premium for a higher service level than other tenants may be allocated a greater share of resources embodies as a greater resource slice. Additionally, as will be illustrated in detail below, the cloud service 100 may provide, as an incentive, more flexibility for using resources when workloads comply with certain standards.

In particular, embodiments may incentivize checkpointing. Tenants who checkpoint their workloads in a certain way may be given some flexibility in the limits of a resource slice. Thus, for example, some embodiments may take proximity to checkpoints into account as part of the heuristic used to determine when to evict the workload. Tenants can structure checkpointing in their workloads to ensure a proscribed proximity to have their workloads given favorable treatment.

The following illustrates an example where the resource slice is a time slice of a processor. However, it should be appreciated, as discussed above, that other resource slices can be alternatively or additionally used. Thus, the following example, should not be construed as limiting the scope of resource slices to only time slices.

Some embodiments may be implemented using the Azure Automation Service workloads management available from Microsoft Corporation of Redmond Wash. However, embodiments can be used by virtually any multi-tenant system that has to provide an equitable sharing of system resources, that runs workloads of various duration (or other resource delineation), that support runtime state persistence.

In the illustrated example, workload requests (e.g. requests 104-1 through 104-*m*) coming from the tenants are placed in one of the workers' queues (e.g. queues 110-1, 110-2 through 110-*p*), from where they are picked up by the workers 108-1 through 108-*p* based on the system resource availability. Each worker is responsible for processing a single queue.

When the workload is loaded in memory, the time is recorded. While running, the workload can be persisted multiple times. When the workload persists is decided by the workflow author. Depending on when the execution time slice expires and when the workload has been last persisted, the workload is evicted. Various eviction rules may be implemented. Some specific examples are illustrated.

Figure 2:
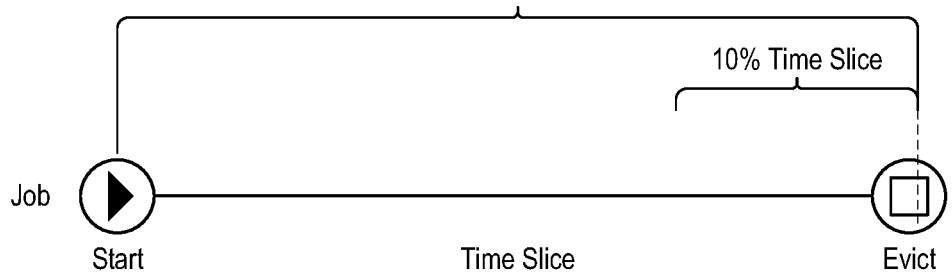
FIG. 2 illustrates an eviction event occurring when a time slice expires.
Figure 3:
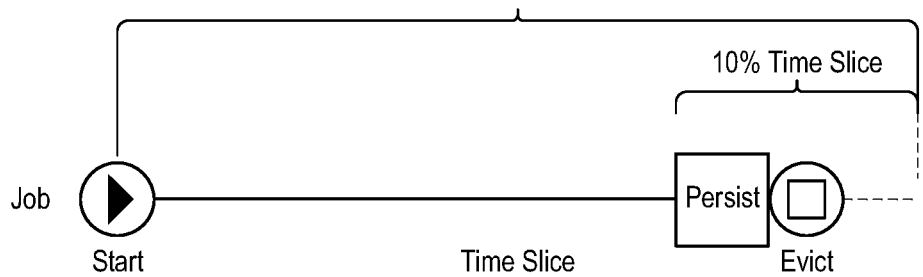
FIG. 3 illustrates an eviction event occurring in a predetermined portion of a time slice.

For example, with reference to FIG. 2, workloads that don't have any checkpoint in the last 10% (or some other selected percentage or portion) of the execution time slice are evicted when the execution time slice expires. With reference to FIG. 3, the workloads that have checkpoints in the last 10% (or some other selected percentage or portion) of the execution time slice are evicted soon after they persist. This behavior leads to a better customer experience, because when reactivated the workloads continue their execution from a checkpoint.

Figure 4:
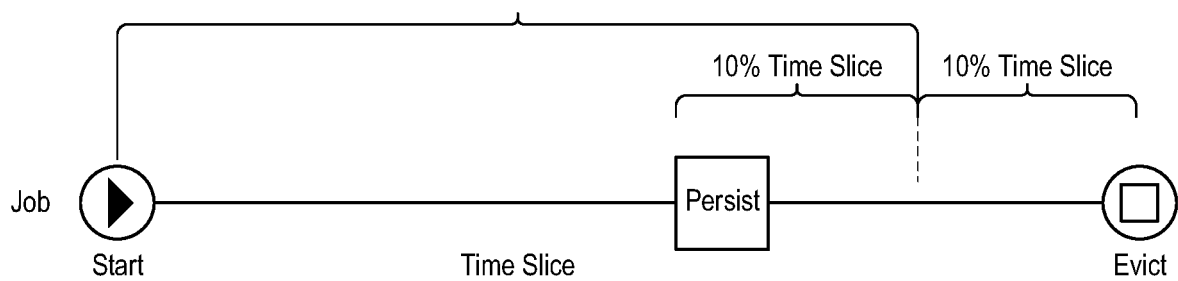
FIG. 4 illustrates a time slice being extended based on checkpointing existing in a predetermined portion of the time slice.
Figure 5:
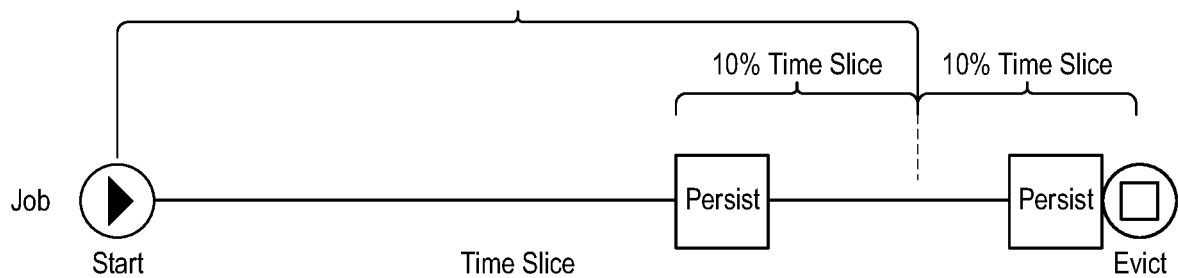
FIG. 5 illustrates a time slice being extended based on checkpointing existing in a predetermined portion of the time slice.

In one variation, embodiments can incentivize checkpointing behavior by "rewarding" workloads with frequent checkpoints by allowing them to run up to 10% (or some other selected percentage or portion) over the time slice. As illustrated in FIGS. 4 and 5, the workloads that have checkpoints in the last 10% (or some other selected percentage or portion) of the time slice are allowed to run 10% (or some other selected percentage or portion) more than the time slice or until they are evicted (see FIG. 4) or persist (see FIG. 5).

The evicted workload's runtime status is not changed but a description that indicates that workload is no longer in memory is attached to the workload. For example the workloads that are "Running" become "Running, Waiting for resources".

Embodiments may accommodate assignment of the evicted workload to a different worker as a way to even the workload distribution between multiple workers. Embodiment may take into account immediate history of resource utilization on workers when making workload placement decisions. The evicted workloads are placed at the back of one of the available worker queues (e.g., one of 110-1 through 110-p). The available queue can be selected randomly or based on the worker resources availability.

When the newly assigned worker (e.g., one of 108-1 through 108-p) picks up the workload again from the queue, the workload is reactivated from the last available checkpoint.

There are some best practices around checkpoints in a workflow that facilitate this execution model. The user should ensure that the workload is persisted frequently and that the execution is idempotent (i.e., if the workload runs multiple times from a checkpoint the results are the same). If the workload does not contain checkpoints or does not manage to progress from an existing checkpoint after a number of trials then embodiments can mark it as "Failed" and stop trying to reactivate it. A tenant can also be notified of the failure. In some embodiments, embodiments may notify the tenant that the workload will more likely succeed if it is checkpointed or has more frequent checkpointing.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
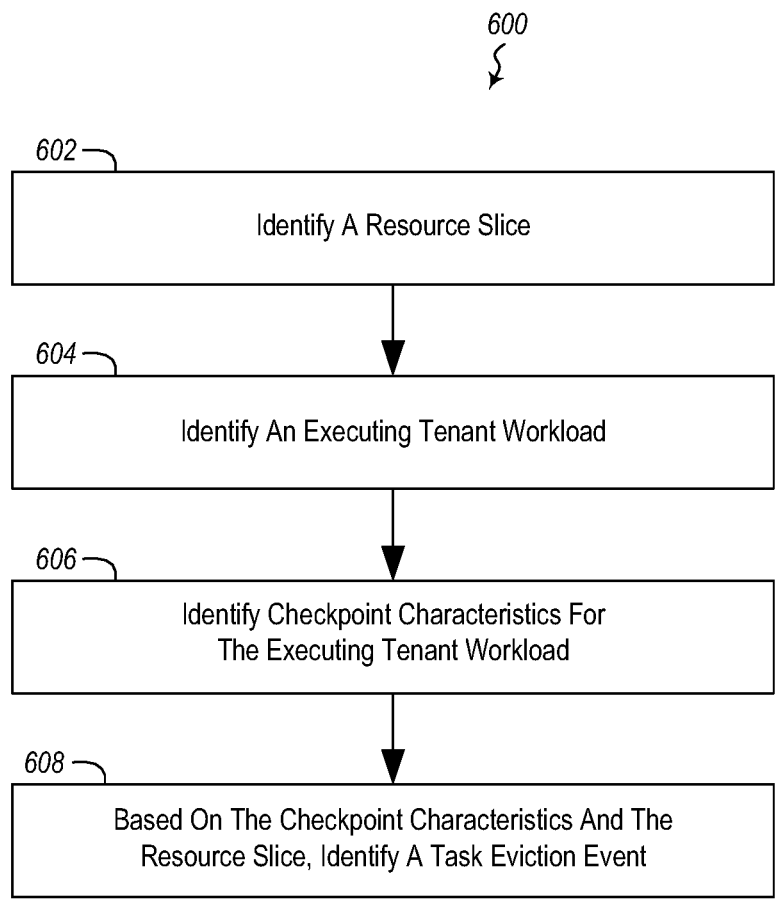
FIG. 6 illustrates a method for providing resources to a plurality of tenants of a distributed computing systems.

Referring now to FIG. 6, a method 600 is illustrated. The method 600 may be practiced in a distributed computing environment that provides computing resources to a plurality tenants. The method includes acts for allocating a limited set of system resources to the tenants (in a fair manner). The method includes identifying a resource slice (act 602). For example, the resource slice may be one or more of: a time slice, a number of commands (e.g. script activities), processor resources, network resources, storage resources, sandbox execution environment resources, memory usage, I/Os, etc.

In some embodiments, the resource slice is dynamically configurable. Thus, for example, the resource slice can change in magnitude depending on a number of different factors. In one example, the resource slice may be dynamically reconfigurable based on manual settings. Thus, an administrator at a cloud service could manually set the size of a resource slice. Alternatively or additionally, the resource slice may be dynamically configurable based on load. Thus for example, if there is low demand for resources, resource slices could be larger than where there is high demand for resources. Alternatively or additionally, resources slices could be dynamically configured based on time of day, time of year, seasons, etc. Thus, for example, a cloud service that handled e-commerce tenants may have smaller resource slice allocations during a holiday shopping season than during other less demanding seasons of the year.

The method 600 further includes identifying an executing tenant workload (act 604). For example, embodiments may identify a workload executing on a worker (such as one of workers 108-1 through 108-p).

The method 600 further includes identifying checkpoint characteristics for the executing tenant workload (act 606). The workflow will identify checkpoints in the workflow which can be identified by the cloud service. This may include identifying if checkpoints exist in a workflow, where the checkpoints exist in a workflow, how often or consistent checkpointing is performed for the workflow, etc.

Based on the checkpoint characteristics and the resource slice, the method 600 further includes identifying a task eviction event (act 608). The location of the checkpoints may affect how and when the task eviction event occurs. For example, in some embodiments, identifying a task eviction event comprises evicting a tenant workload prior to the expiration of the resource slice when checkpointing occurs prior to the expiration of the resource slice. An example of this is illustrated in FIG. 3 above.

Alternatively or additionally, identifying a task eviction event comprises evicting a tenant workload within some predetermined extension of the expiration of the resource slice when checkpointing occurs within the predetermined extension of the expiration of the resource slice. An example of this is illustrated above in FIG. 5.

The method 600 may further include determining that a tenant workload continues to be evicted without checkpointing a predetermined number of times. As a result, the method 600 includes performing a corrective function. Thus for example, as illustrated in FIG. 2, a workload may be evicted before it can be checkpointed. An evicted workload may be rescheduled and retried one or more additional times.

Once the workload has been retried a predetermined number of times, some other corrective action will be performed. This can be a corrective action on the workload. For example, the corrective action may include terminating the workload to prevent future retries of the workload. Alternatively or additionally, the corrective action may include may include extending the resource slice to grant some additional resources to perform the workload. In some embodiments, this may be performed by premium purchase, automatically charging additional amounts to a tenant, etc. Alternatively or additionally, this may be a corrective action performed with respect to a tenant. For example, a tenant may be notified that the workload cannot complete due to insufficient checkpointing. In some extreme cases, the tenant may be banned from the cloud service or put in some probationary state for not complying with checkpointing requirements.

The method 600 may further include identify that there is no load on a workload queue and as a result, not performing some event even though the workload exceeded resource slice constraints that would have ordinarily caused the workload to be evicted. Thus for example, if there are no other workloads pending in a workload queue and a workload should have been evicted, additional resources can be granted to allow the workload to complete.

The method 600 may further include notifying a user of constructive treatment (such as extending the resource slice by some amount) of their workload based on the user's use of checkpoints. For example, a tenant may be notified in a service report provided on a periodic basis regarding the amount of constructive treatment their workloads have been granted based on the tenant's use of checkpointing. Alternatively or additionally, each time constructive treatment is granted, an alert may be issued to the tenant. Other methods may be alternatively or additionally used to alert the user to favorable treatment.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a H a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processor(s); and
   one or more computer-readable hardware storage device(s) having stored thereon computer-executable instructions that are executable by the one or more processor(s) to cause the computer system to run a cloud service configured to incentivize use of certain workload checkpointing behavior by providing constructive treatment to workloads demonstrating said workload checkpointing behavior by causing the cloud service to at least:
   assign a workload to a resource of the cloud service;
   identify an eviction for the workload, the eviction being an event in which an originally assigned use of the resource for the workload expires;
   cause the resource to perform work for the workload;
   determine that a checkpoint of the workload is scheduled to be performed within a determined proximity to the identified eviction, wherein, as a result of the checkpoint being within the determined proximity to the identified eviction, the workload is determined to demonstrate the workload checkpointing behavior; and
   based on determining the workload demonstrates the workload checkpointing behavior, provide the constructive treatment to the workload by permitting an extended use of the resource beyond the originally assigned use.

2. The computer system of claim 1, wherein the originally assigned use includes a timed amount of processor usage.

3. The computer system of claim 1, wherein the checkpoint is an event in which information associated with execution of the workload is persisted to storage.

4. The computer system of claim 1, wherein the eviction occurs when the resource has executed the workload for a determined amount of processor time.

5. The computer system of claim 1, wherein the eviction occurs when the resource has executed the workload for a determined number of script commands.

6. The computer system of claim 1, wherein the eviction occurs when the resource has executed the workload for a determined number of processors operations.

7. The computer system of claim 1, wherein causing the resource to perform the work for the workload includes loading the workload into memory of the resource.

8. The computer system of claim 1, wherein the cloud service is further configured to notify a tenant that a particular workload will more likely succeed if the particular workload is checkpointed.

9. The computer system of claim 8, wherein the workload is submitted to the cloud service by a tenant, and wherein a notification is sent to the tenant informing the tenant that the workload will more likely be successfully executed if the workload includes more frequent checkpoints.

10. The computer system of claim 1, wherein the cloud service is further configured to determine where, within the workload, any checkpoints exist.

11. The computer system of claim 1, wherein the cloud service is further configured to determine a consistency of checkpoints within the workload.

12. The computer system of claim 1, wherein, upon a condition in which the resource is not assigned any other workloads, the resource continues to execute the workload beyond the originally assigned use.

13. The computer system of claim 1, wherein the cloud service receives a request comprising the workload, and wherein the request is received at a queue of the resource.

14. A method for incentivizing use of certain workload checkpointing behavior by providing constructive treatment to workloads demonstrating said workload checkpointing behavior, the method being implemented by a cloud service executing on a computer system, the method comprising:
assigning a workload to a resource of the cloud service;
identifying an eviction for the workload, the eviction being an event in which an originally assigned use of the resource for the workload expires;
causing the resource to perform work for the workload;
determining that a checkpoint of the workload is scheduled to be performed within a determined proximity to the identified eviction, wherein, as a result of the checkpoint being within the determined proximity to the identified eviction, the workload is determined to demonstrate the workload checkpointing behavior; and
based on determining the workload demonstrates the workload checkpointing behavior, providing the constructive treatment to the workload by permitting an extended use of the resource beyond the originally assigned use.

15. The method of claim 14, wherein the eviction occurs when the resource has executed the workload up until a determined amount of non-volatile storage resources have been used.

16. The method of claim 14, wherein the eviction occurs when the resource has executed the workload up until a determined amount of volatile memory resources have been used.

17. The method of claim 14, wherein the resource is one of multiple resources that are provided to a plurality of tenants.

18. The method of claim 14, wherein the eviction for the workload is at least partially based on how many checkpoints are scheduled for the workload.

19. The method of claim 14, wherein the workload includes multiple checkpoints such that information associated with execution of the workload is persisted to storage multiple times.

20. One or more hardware storage device(s) having stored thereon computer-executable instructions that are executable by one or more processors of a computer system to thereby cause the computer system to run a cloud service configured to incentivize use of certain workload checkpointing behavior by providing constructive treatment to workloads demonstrating said workload checkpointing behavior by causing the cloud service to at least:
assign a workload to a resource of the cloud service;
identify an eviction for the workload, the eviction being an event in which an originally assigned use of the resource for the workload expires;
cause the resource to perform work for the workload;
determine that a checkpoint of the workload is scheduled to be performed within a determined proximity to the identified eviction, wherein, as a result of the checkpoint being within the determined proximity to the identified eviction, the workload is determined to demonstrate the workload checkpointing behavior;
based on determining the workload demonstrates the workload checkpointing behavior, provide the constructive treatment to the workload by permitting an extended use of the resource beyond the originally assigned use.

* * * * *